June 3, 1930.  F. G. FISCHER  1,762,014
HOUSEHOLD HEATING UTENSIL
Filed June 7, 1928
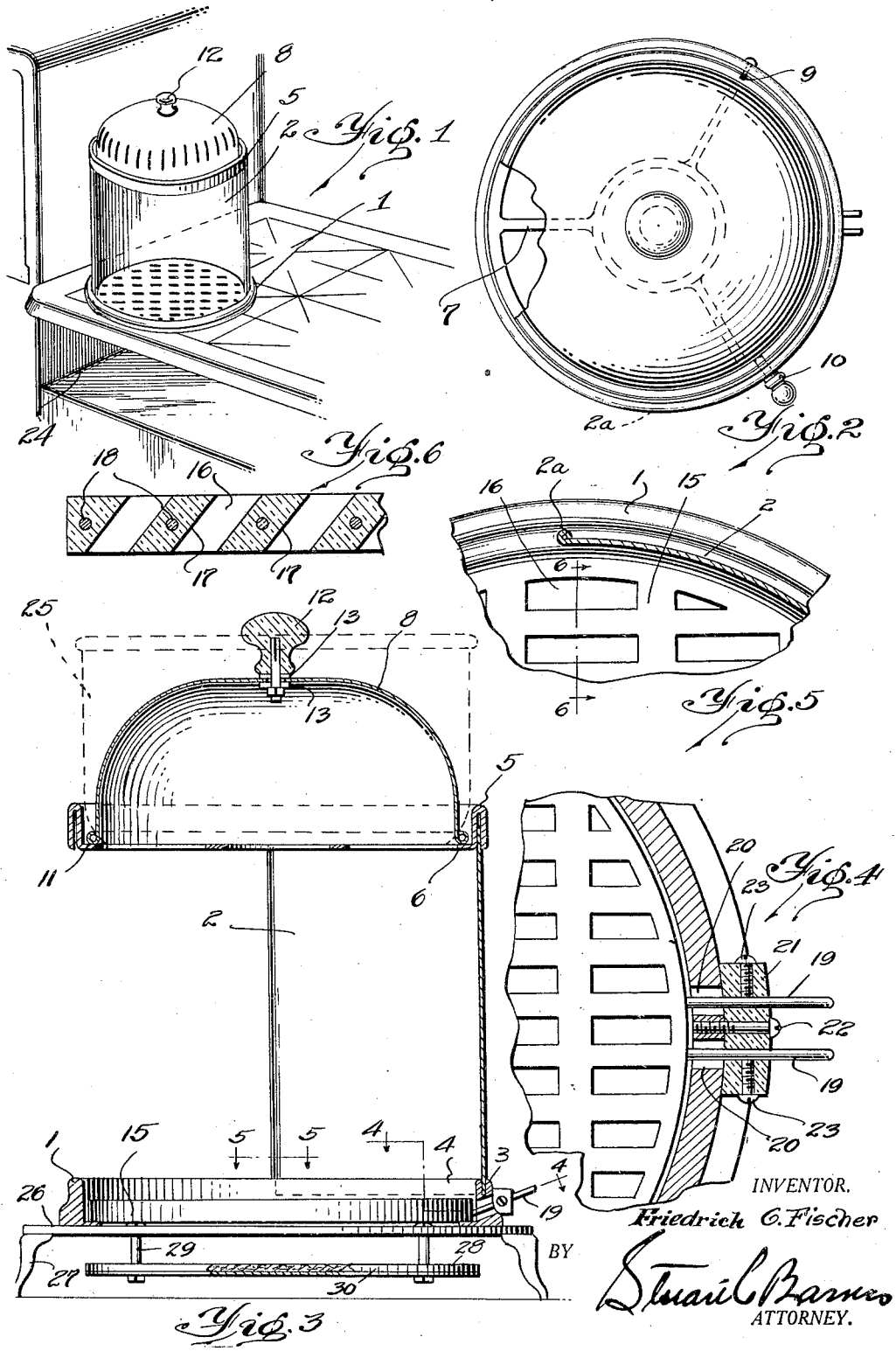
INVENTOR.
Friedrich G. Fischer
BY
Stuart C. Barnes
ATTORNEY.

Patented June 3, 1930

1,762,014

UNITED STATES PATENT OFFICE

FRIEDRICH G. FISCHER, OF DETROIT, MICHIGAN

HOUSEHOLD HEATING UTENSIL

Application filed June 7, 1928. Serial No. 283,555.

This invention relates to a household heating utensil which can be employed for various heating purposes.

It is an object of the invention to provide a utensil which is simple and light in construction and which is portable. It embodies an arrangement which can be placed over a gas flame, as for instance, on an ordinary gas stove, for the purpose of utilizing the heat from the flame for heating room and at the same time can be used, if desired, for cooking. The utensil preferably embodies an electrical heating element so that it may be placed in any desirable position on a table or floor for locally heating by electricity the surrounding space; also it may be used for cooking electrically, or for boiling water, and in this regard a suitable container of water can be placed on the utensil for the purpose of maintaining relatively high humidity in the surrounding area while it is being used for heating purposes.

The device embodies primarily a heating element and a heat reflecting device, and the element can be heated as elected, by a flame or an electric resistance wire, and the heat therefrom is reflected out over the room. Preferably the device is relatively small so that it can be easily transported from one place to another.

In the accompanying drawings:

Fig 1 is a perspective view showing the device placed upon a conventional gas stove over one of the burners of the stove.

Fig. 2 is a top plan view with part of the cover cut away.

Fig. 3 is a vertical section taken through the device showing some of the details of construction.

Fig. 4 is an enlarged detail in section taken substantially on line 4—4 of Fig. 3.

Fig. 5 is an enlarged detailed section taken substantially on line 5—5 of Fig. 3.

Fig. 6 is an enlarged sectional view taken through the heating element.

The device may advantageously be generally circular in horizontal section, and accordingly is provided with a base 1 circular in form. Carried by this base is a vertically disposed reflector 2 curved so as to fit onto the base. For the purpose of securing the reflector to the base the base may be grooved so that the lower edge of the reflector fits into the groove, as at 3, and a suitable number of screws 4 may be taken through the base into the lower end of the reflector. This reflector may be made of any suitable metal for the purpose, having preferably, a polished surface, and this reflector may advantageously be made of a copper sheet.

Resting upon the top of the reflector is a top ring 5 which may be secured to the reflector in any suitable manner. This top ring is provided with a flange 6 and a spider formation 7. A suitable cover 8 is arranged to rest upon the flange 6, and this cover is removably held in place by a small screw or lug 9 and adjusting screw 10 provided with a suitable knob for manipulation. The lug 9 and screw 10 fit over the rolled edge 11 of the cover. To remove the cover the screw 10 is retracted, permitting one edge of the cover to be raised so that the edge which underlies the lug 9 can be withdrawn laterally far enough to pass by the lug 9. Placing the cover on the device is just the reverse. This cover is preferably provided with a suitable handle 12 insulated by washers 13 of heat resisting material such as asbestos.

The base is constructed to receive and hold a heating element 15. This heating element may be made of any material suitable for the purpose, and by way of example, clay may be mentioned. This element is provided with a series of openings 16 extending therethrough, and these openings are disposed at an angle to the vertical, as shown in Fig. 6. The reason for this is to provide surfaces 17 bounding the openings against which a flame may strike in heating the element, as will presently be more fully described. Preferably the element is rather loosely contained within the base to permit of varying coefficients of expansion, and the element may be held in the base by any suitable means.

This heating element is preferably arranged to be heated either by an independent flame or by a self-contained electric heating element, and for this purpose resistance wires of the heating element are included. These wires are referenced 18 and may be embedded directly into the heating material of the element. A pair of contacts 19 connect to the resistance wires, and the base is provided with openings 20 through which the elements extend, and these openings are preferably quite a bit larger than the elements. On the outside of the base a suitable insulator 21 is placed over the elements, this insulator having openings through which the elements extend and which fairly closely fit around the elements. This insulator may be made of porcelain or other suitable material and may be held and properly positioned on the device by means of a screw 22 whereas the contacts may be held by screws 23. It will be noted that when the insulator 21 is properly positioned that the elements are more or less centrally disposed as regards the openings 20 so that there is no contact with the metallic base; accordingly, no insulation is needed within these openings.

In use the device may be placed upon a gas stove, referenced 24 in Fig. 1, and it will be understood that the device is rather light so that it can be easily carried by the handle 12. When it is desired to heat the room, it may be used as shown in Fig. 1 with the cover in place. The gas flame heats the heating element 15. Due to the angular disposition of the opening 16 the gas flame strikes the wall 17 of the openings, and as a result the heating element becomes highly heated; in fact, it has been found that a clay heating element will become red with heat. As the heat from the element rises, it is more or less caught or confined by the dome shaped covering and is reflected out over the room by the reflector element 2. The device is very useful for heating a room at times when the general heating plant of the building is not in use although need is felt of some heat, as for instance, in the spring or fall. If it is desired to heat or cook some food stuffs, heat water or the like, the cover may be removed and a suitable container 25 may be placed upon the spider 7. Of course at the time the device is used on a gas stove there is no electrical connection with the heating element.

The device can be used independently and heated electrically where it is desired to heat a room which has no gas stove, or if it be desirable to prepare some food stuffs at the table. In this event the device can be placed in any suitable location on the floor, table, or other suitable support and suitable electric conduits connected to contacts 19. If it is used for local heating purposes a pan of water for maintaining the humidity of the room can be placed upon the spider 7; or if at the table, food stuffs can be heated in a suitable container on the spider.

When the device is so used it is preferable to place it upon a suitable support so that the heat therefrom can be insulated and the floor or table, or whatever the device rests upon. Such a support is shown at 26 having legs 27. Preferably this support includes a heat insulating element 28 carried by the support a distance spaced below its top, as by means of bolts 29. This heat resisting substance may be of an asbestos composition, and a metallic place 30 can be used below the heat resisting substance to support it.

The embedding of the resistance wires directly in the body of the heating element makes a heating element which is useful in many other places than in connection with the specific heater herein described. The resistance wires are thus protected from becoming broken or otherwise interfered with or distorted by some outside force while at the same time a very efficient heater is provided inasmuch as the material forming the body of the heating element becomes highly heated.

Claims:

1. A portable household heating utensil, comprising a base for holding a heating element adapted to be heated by an outside heating source, a reflector extending partially around the heating element and disposed vertically, and a cover member at the top of the reflector.

2. A portable household heating utensil, comprising a base for holding a heating element adapted to be heated by an outside heating source, a vertically disposed substantially semi-circular shaped reflector, a top ring carried by the top of the reflector, and a cover carried by the top ring.

3. A portable household heating utensil, comprising a base for holding a heating element adapted to be heated by an outside heating source, a vertically disposed substantially semi-circular shaped reflector, a top ring carried by the top of the reflector, and a cover carried by the top ring, means removably holding the cover in place, said top ring being adapted to hold a receptacle or the like when the cover is removed.

4. A portable household heating utensil, comprising a base for holding a heating element adapted to be heated by an outside heating source, a vertically disposed substantially semi-circular shaped reflector, a top ring carried by the top of the reflector, and a cover carried by the top ring, means removably holding the cover in place, and a spider carried by the top ring for supporting a receptacle or the like when the cover is removed.

5. A portable household heating utensil comprising, a base, a top ring shaped similarly to the base, a reflector carried by the base and supporting the top ring, a heating element carried by the base, and electrical resistance wires incorporated in the heating element for heating the element.

6. A portable household heating utensil comprising, a base, a top ring shaped similarly to the base, a reflector carried by the base and supporting the top ring, a heating element carried by the base, electrical resistance wires incorporated in the heating element for heating the element, and a cover supported by the top ring for confining heat whereby the same may be reflected horizontally outward by the said reflector member.

7. A portable household heating utensil comprising, a base, a top ring shaped similarly to the base, a reflector carried by the base and supporting the top ring, a heating element carried by the base, electrical resistance wires incorporated in the heating element for heating the element, a cover supported by the top ring for confining heat whereby the same may be reflected horizontally outward by the said reflector member, means for removably holding the cover on the top ring, and means associated with the top ring for supporting a receptacle or the like when the cover is removed.

8. A portable household heating utensil, comprising a base ring, a top ring, a substantially semi-circular reflector connecting the two, a cover for the top ring, a heating element supported by the base ring, said utensil being adapted to be placed directly over a gas flame or the like with the flame in direct contact with the heating element whereby the same is heated and such heat is reflected substantially horizontally by the reflector.

9. A portable household heating utensil, comprising a base ring, a top ring, a substantially semi-circular reflector connecting the two, a cover for the top ring, a heating element supported by the base ring, said utensil being adapted to be placed directly over a gas flame or the like with the flame in direct contact with the heating element whereby the same is heated and such heat is reflected substantially horizontally by the reflector, said heating element being relatively loosely carried by the base to accommodate for varying coefficients of expansion.

10. A portable household heating utensil, comprising a body of material adapted to be heated, said body of material having a multiplicity of openings therein which are disposed angularly with respect to the vertical, whereby a flame may make direct contact with the walls of the openings, a base for holding said body of material, a reflector extending partially around the body of material and disposed vertically, and a cover member at the top of the reflector.

11. A portable household heating utensil, comprising a body of clay, said body of clay having a multiplicity of openings therein which are disposed angularly with respect to the vertical, a base for holding said body of clay, a reflector extending partially around the body of material and disposed vertically, and a cover member at the top of the reflector.

In witness whereof I affix my signature.

FRIEDRICH G. FISCHER.